United States Patent [19]
Martin

[11] Patent Number: 5,373,810
[45] Date of Patent: Dec. 20, 1994

[54] CAGE DOOR COMBINATION LOCK-LATCH

[76] Inventor: Edwin R. Martin, 1436 Deer Creek Dr., Englewood, Fla. 34223

[21] Appl. No.: 191,299

[22] Filed: Feb. 3, 1994

[51] Int. Cl.⁵ .............................................. A01K 31/02
[52] U.S. Cl. ........................................ 119/17; 24/370
[58] Field of Search ...................... 119/17, 18; 24/370, 24/371

[56] References Cited

U.S. PATENT DOCUMENTS

| | | | |
|---|---|---|---|
| 230,795 | 8/1880 | Maxheimer | 119/17 |
| 1,232,528 | 7/1917 | Gemmill | 24/370 |
| 1,894,895 | 1/1933 | Steele et al. | 24/370 |
| 2,045,472 | 6/1936 | Kearney et al. | 119/17 |
| 2,113,743 | 4/1938 | Phipps | 24/370 |
| 2,275,914 | 3/1942 | Lorenz | 119/17 |
| 2,320,067 | 5/1943 | Caughren | 24/370 |
| 2,410,879 | 11/1946 | Hegener | 119/17 |
| 2,693,786 | 11/1954 | Babros et al. | 119/17 |
| 2,864,335 | 12/1956 | Yellin | 119/17 |
| 3,499,674 | 3/1970 | Voran et al. | 119/17 |
| 3,867,903 | 2/1975 | Fleshman | 119/17 |
| 3,974,587 | 8/1976 | Leuake et al. | 24/370 |

Primary Examiner—Paul J. Hirsch
Attorney, Agent, or Firm—Frank A. Lukasik

[57] ABSTRACT

A combination cage locking and latching device made from a light gauge wire or molded plastic which is rotatably fixed to the cage door top horizontal wire. The device consists of shaped wire having a locking portion, a latching portion, and a "U"-shaped mounting portion formed between the locking portion and the latching portion at a position nearer to the locking portion. The locking portion is formed sufficiently long to extend below and to engage a first horizontal rod to prevent unauthorized opening, and the latching portion is formed and positioned to extend outside the cage for grasping and pulling the cage door upwardly to an open position and sufficiently long for engaging a second horizontal rod of said cage for holding the cage door in an open position.

4 Claims, 8 Drawing Sheets

CAGE DOOR COMBINATION LOCK-LATCH

This invention has been filed under Disclosure Document No. 344,695.

BACKGROUND OF THE INVENTION

1. Field of the invention

The invention relates generally to bird cages and more particularly to a device to prevent a cage door from being opened and also provides a mechanism to hold a cage door in an open position when desired.

2. Discussion of the prior art

As a general rule, manufacturers supply bird and animal cages with vertically operated doors, since the weight of a vertically sliding door is generally sufficient to hold the door in a closed position. These doors do not, however, have any safety features to prevent the bird or animal from opening the door. In addition, when the cage door is opened there is no mechanism to hold them in an open position. With the increased popularity of exotic birds such as parrots, which are quite expensive and valuable, it is especially important to prevent their escape.

Several prior art devices have attempted to provide various types of locks. One such device is shown in U.S. Pat. No. 229,022 to Whipple which discloses a sash lock comprising a rocking arm pivoted at its center perpendicularly within one of the bars of the upper sash, and having at each end, a lug to project over the meeting rail of the lower sash as the arm vibrates, together with other devices. A plate with notches comprises a device to lock the arm in certain positions. U.S. Pat. No. 311,366 to Rex discloses a sash fastener comprising a combined right-angle drop and serrated cam pivoted to the side of the window frame in such positions as to thrust a right angle arm into a hole in the moving sash, or under it when raised, by gravity, and to present a cam surface to the face of the window sash to hold it at any height when arbitrarily manipulated for that purpose.

U.S. Pat. No. 1,149,809 to Cessna discloses a door hasp having a shank and a substantially semi-circular hooked portion. The shank and hooked portion are formed in a single piece and to the lower end of the shank is detachably secured a handle by means of which the hasp may be operated. The hasp is pivoted at a point substantially co-incident to the junction of the hooked portion and the shank to a door. The hasp may be rotated upon its pivot without engaging with and scratching or otherwise marring the door.

U.S. Pat. No. 2,693,786 to Babros et al discloses a means of latching a door for a bird cage in a closed position. A sheet metal latch is provided which is looped about the second wire above the top of the door opening. This latch has an inwardly bent portion that is convex on its upper side and which may be sprung beneath the top bar or crosspiece to releasably hold the door in closed position. Whenever it is desired to open the cage to permit egress of the bird, the latch is swung forwardly to disengage the door and the door is allowed to swing downwardly until the engagement of the laterally bent portions take place with the wires. In this position, the door is self supporting in a horizontal position.

U.S. Pat. No. 3,862,620 to Bernhard et al discloses an animal cage with a lock device comprising a horizontal bar with a plurality of stops on which it can be selectively positioned to prevent unwanted opening of the cage's door and other movable components. The locking device comprises a rigid bar which is mounted across the exterior of the front wall. The lock bar is an angle iron, supported at its two ends by a pair of like bar supports. The lock bar has a first stop element comprising a rod projection welded onto the bar and which extends upward to be positioned in line with the forward movement of the pull handle. A second stop element is in the shape of an "L" and extends upwardly and inwardly to overlap a portion of the bottom plate member of the cage door. A third stop element has a right angle extension that overlaps the other pull handle for the false back wall.

U.S. Pat. No. 4,570,574 to Burkholder discloses a cage door for easy one hand operation. The door is hingedly secured to the cage. An "L" shaped hook is attached to each of the free ends of the legs and these hooks engage with cage wires. The door is opened by squeezing the legs together which disengages the hooks from the cage wires. A bracket is positioned above the door and extends between the legs to prevent those legs from being squeezed together. The bracket can be moved from between the legs by pushing it upwardly with the index finger of the hand being used to open the door. The legs can be squeezed together to disengage the hooks from the cage wires once the bracket is removed form between the legs.

With the existence of all of the above locks regarding this subject, it has been found that the device that is most common means used by pet shop owners to secure this type of door in a closed position or open position is with a wire core twist commonly used on plastic bags.

SUMMARY OF THE INVENTION

The invention is a light gauge wire or molded plastic device which is rotatably fixed to the cage door top horizontal wire. When the combination lock-latch device of the invention is fixed to the cage door, it becomes a part of the cage door. When the door is raised, without disengaging the lock-latch of the invention, the locking portion engages with the lower cage horizontal wire thus restricting its upper movement. When the latch portion is grasped and raised in an upper movement to open the cage, the latch portion causes the lock portion to swing out, thus providing clearance as the lock portion passes the lower cage horizontal bar. When the cage door is fully opened, the latch portion is hooked over the upper cage horizontal bar to hold the door open.

It is therefore a principle object of the invention to provide an economical, easily operated, device to prevent a vertically operated cage door from being lifted, unless disengaged.

It is another object of the invention to provide a device to hold a cage door open when latched.

It is a still further object of the invention to provide a simple, one-hand operated, cage door, locking and latching device.

These objects and other attendant advantages of this invention will be readily appreciated as the same becomes better understood by reference to the following detailed description, when taken in connection with the accompanying drawings.

DESCRIPTION OF THE PREFERRED EMBODIMENT

Figure 1:
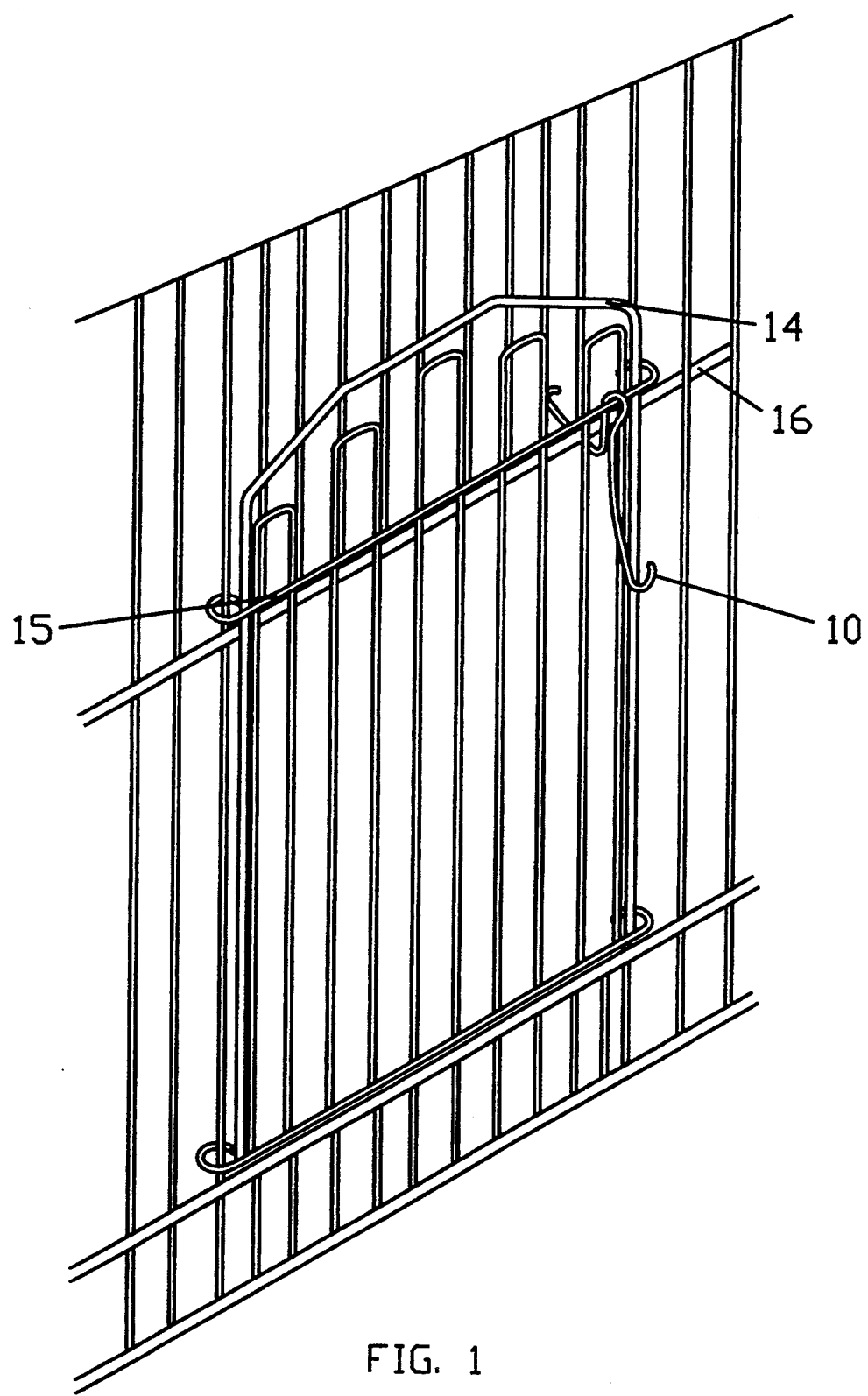
FIG. 1 is a perspective view of the cage door combination lock-latch of the invention in the lock position.

Referring now to the figures, the combination safety locklatch of the invention is shown generally with the numeral 10. The combination safety lock-latch 10 of the invention comprises two principle portions, safety lock portion 11 and latch portion 12. The cage is shown generally by the numeral 13, the vertical sliding cage door 14, cage door horizontal rod 15, lower cage horizontal rod 16, and upper cage horizontal rod 17.

A third section of combination lock-latch 10 is the "U"-shaped mounting portion 18, which is rotatably mounted on cage door horizontal rod 15 by hooking the "U"-shaped mounting portion 18 over the cage door horizontal rod 15 and crimped as at uncrimped position 19. When the combination lock-latch 10 is crimped, as shown at 19, the combination lock-latch becomes part of the cage door 14. When a light gauge wire is used to fabricate combination lock-latch 10, the "U"-shaped portion 18 is open, as at crimp position 19, to provide clearance for fitting over cage door horizontal rod 15. When combination lock-latch 10 is fitted, the wire is crimped as at crimp position 19. When a molded plastic combination lock-latch 10 is fabricated from molded plastic, the "U"-shaped portion is closed (crimped) and must be opened for assembly. The natural flexibility of plastic, with its memory, makes this method possible.

Figure 5:
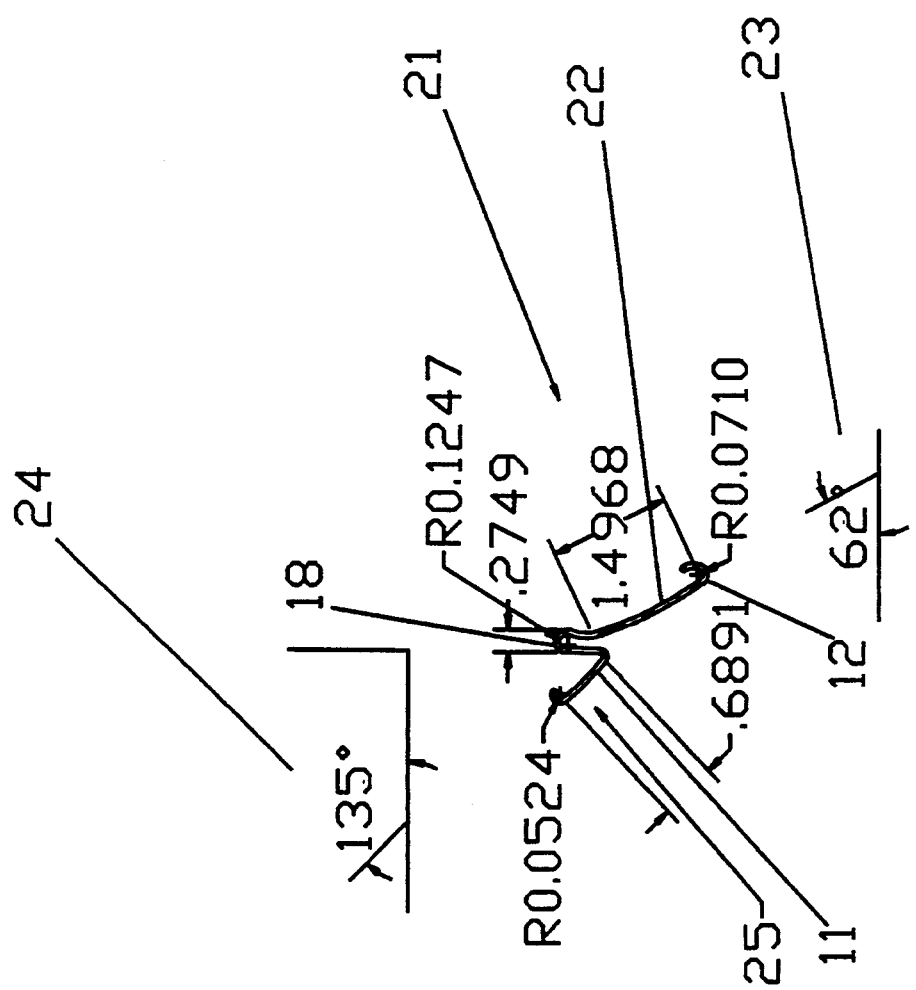
FIG. 5 is a side view of the combination lock-latch showing dimensions of a preferred embodiment.

An example of a preferred embodiment of the combination lock-latch 10 of the invention is shown in FIG. 5. The dimensions and angles have been calculated to fit the standard bird cage which is commercially available. The diameter of the wire of lock-latch 10 of 1/16 inch, the length 21, 1.4968 inches, and the angle 23, 62 degrees, of latch arm 22 are optimum sizes and should fit the majority of cages 13. The angle 24, 135 degrees, and the angle 23, provide a center of gravity (not shown) which keeps the "U"-shaped mounting portion 18 of the combination lock-latch 10 in a generally perpendicular relationship with the bottom (not shown) of the cage 13. The radius of the "U"-shaped mounting portion 18, selected to fit around most cage horizontal rods, is about 0.2749 inches. The perpendicular position keeps the safety lock portion 11 directly below lower cage horizontal rod 16 to assure that the lock portion 11 will engage the lower cage horizontal rod 16 if the bird or animal attempts to lift the cage door 14. The length of lock arm 25 is sufficiently long to assure that safety lock 11 will engage the lower cage horizontal rod 16 at all times. The perpendicular position also keeps the latch 12 extended outside the cage 13 for easy gripping by the pet owner, with one hand, when it is desired to open and latch the cage door 14.

Figure 8:
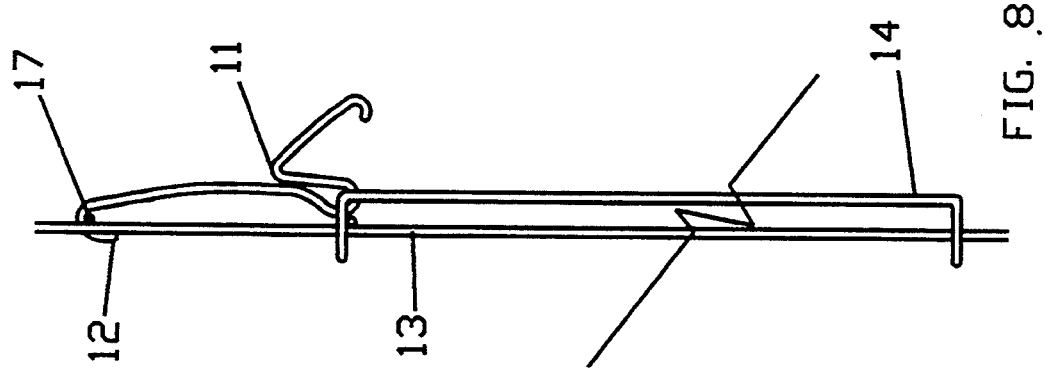
FIG. 8 is a side view, partially in section, of the combination lock-latch in a latching position on a cage door.
Figure 7:
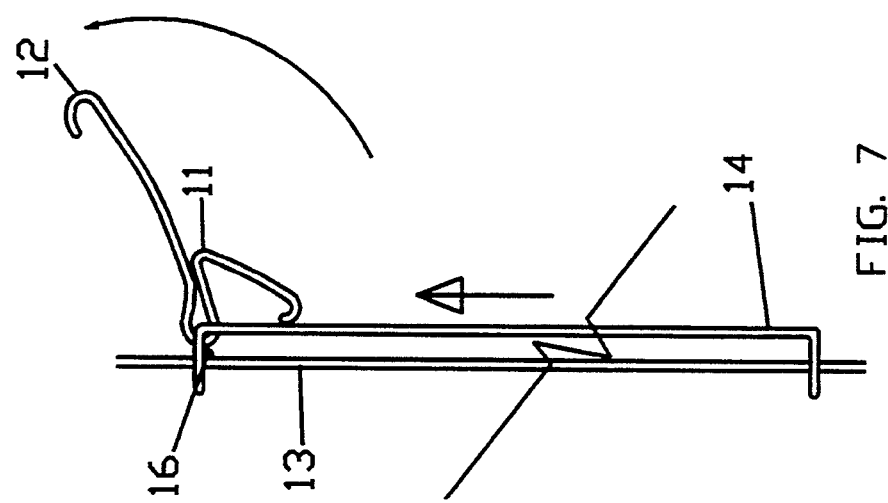
FIG. 7 is a side view, partially in section, of the combination lock-latch in an opening position on a cage door.
Figure 6:
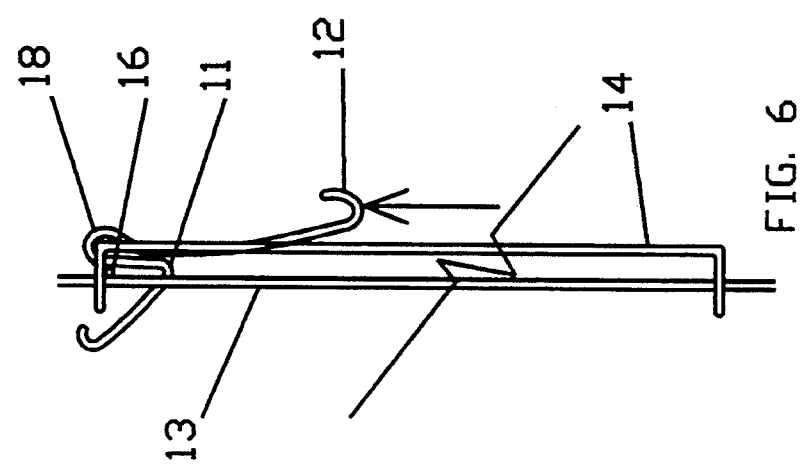
FIG. 6 is a side view, partially in section, of the combination lock-latch in a locking position on a cage door.

FIGS. 6-8 show the three steps in opening and latching the cage door 14. The arrow in FIG. 6, points to the latch portion 12, and indicates the grasping portion to open the cage door 14. Safety lock-latch 10 is then swung outwardly as shown in FIG. 7 to clear lower cage horizontal rod 16 and pulled upwardly until it is latched on upper cage horizontal rod 17 as shown in FIG. 8.

As can be seen from the above description, the invention prevents a vertically operated cage door from being lifted, unless it is disengaged and the invention holds the cage door open when it is in a latched position. With the invention, one hand operation (disabled persons) may easily operate the latching mechanism. Normal cage doors require two hands to operate, one hand to open and hold the door, and the second hand to apply the prior wire twist to hold the door open while accessing the cage interior with the other hand. This invention allows a disabled person to open and secure the cage door open with one hand.

Figure 2:
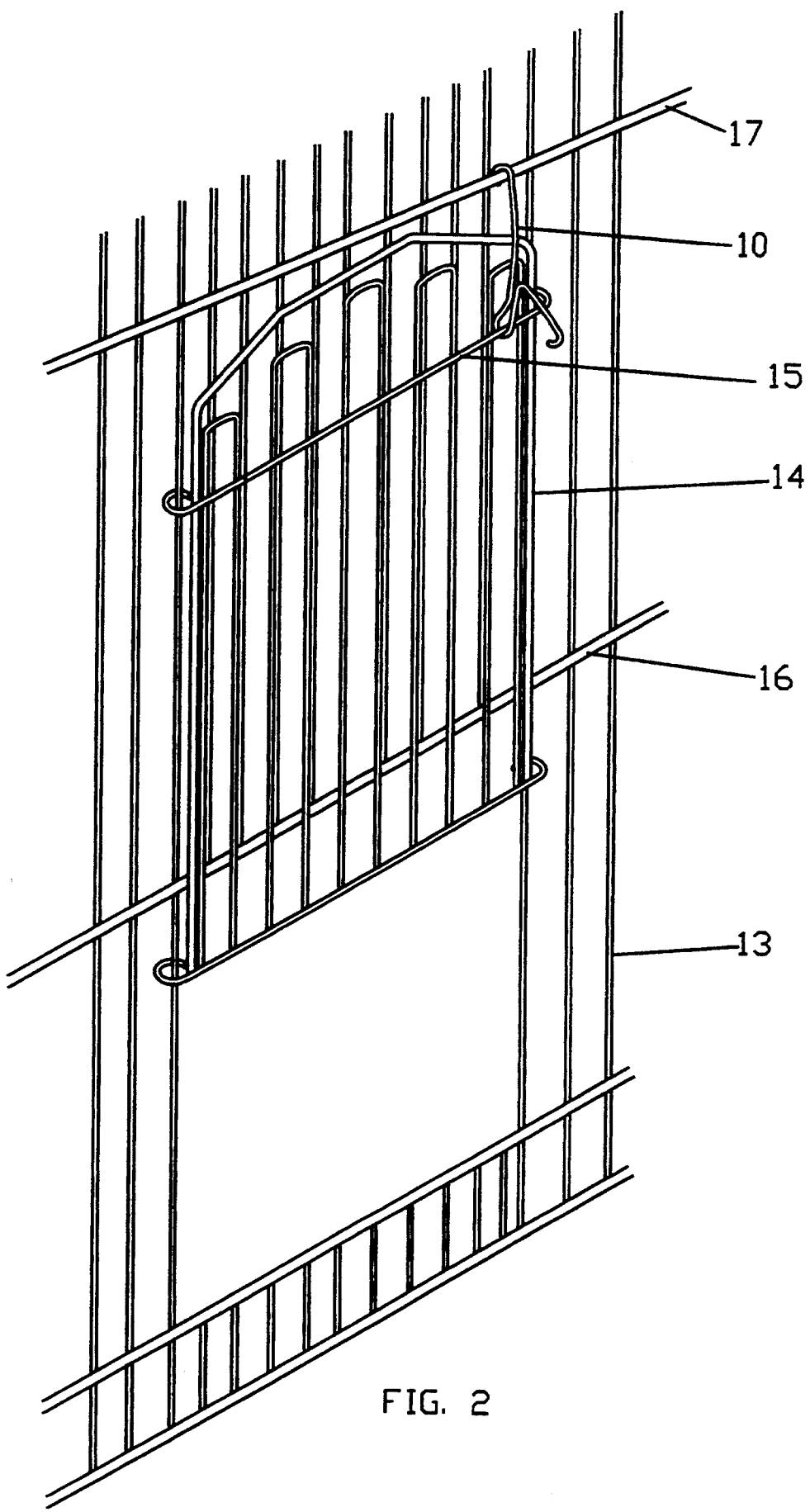
FIG. 2 is a perspective view of the cage door combination lock-latch of the invention in the latch position.
Figure 3:
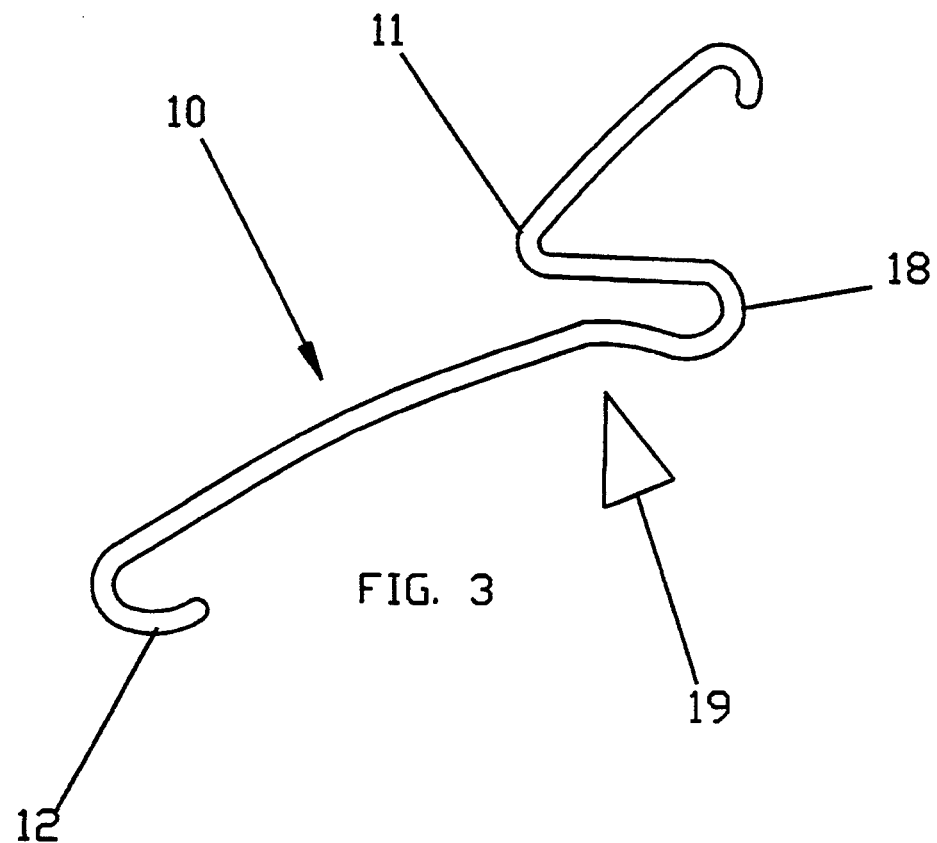
FIG. 3 is a side view of the cage door combination lock-latch of the invention before installation.
Figure 4:
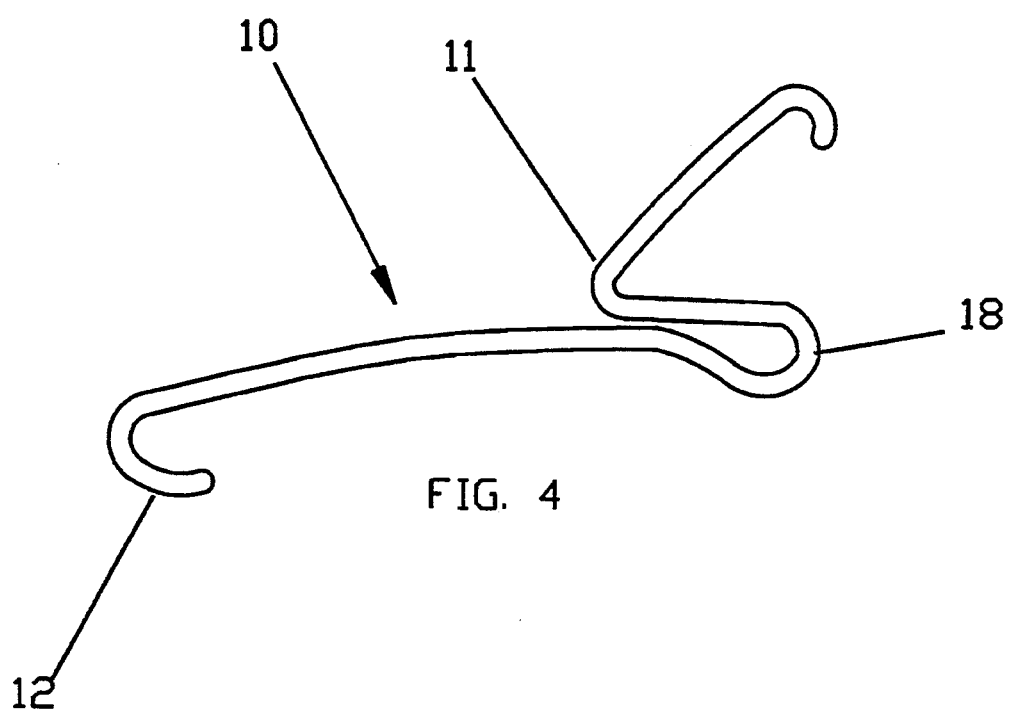
FIG. 4 is a side view of the cage door combination lock-latch of the invention after crimping.
Figure 9:
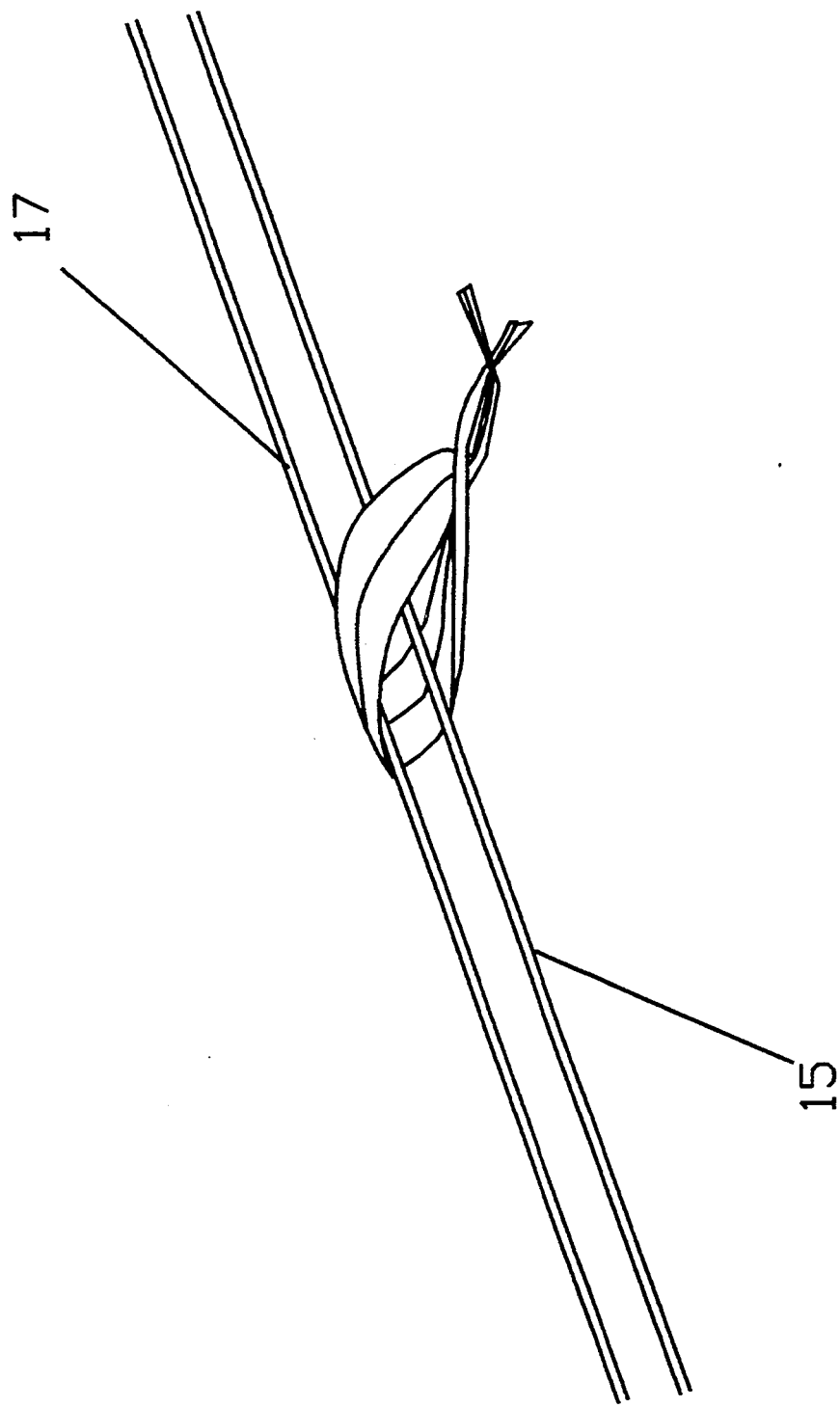
FIG. 9 is a view of the prior art device.
Figure 10:
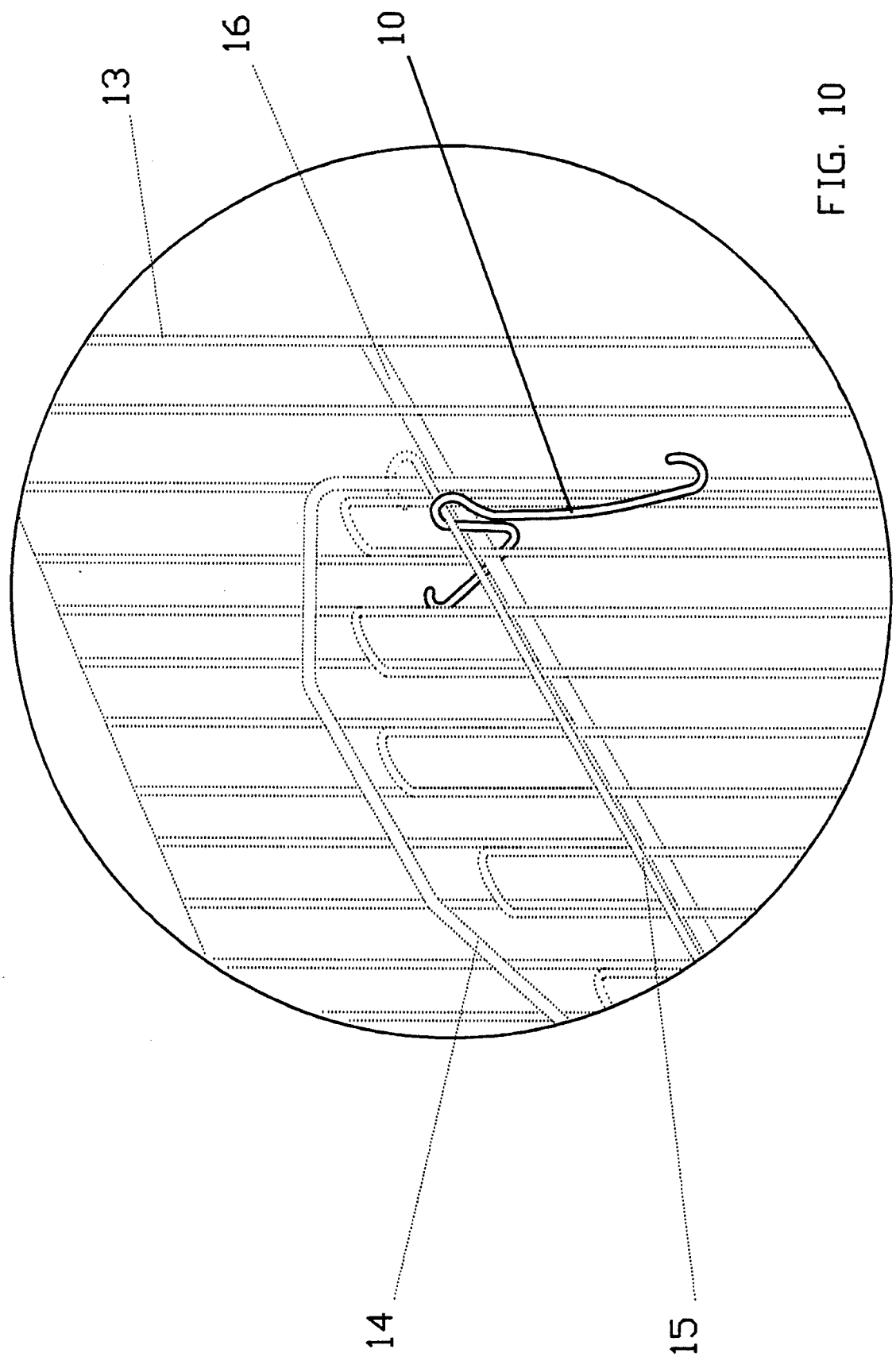
FIG. 10 is a perspective view of a section of a cage, in dotted lines, showing the combination lock-latch in a lock position.
Figure 11:
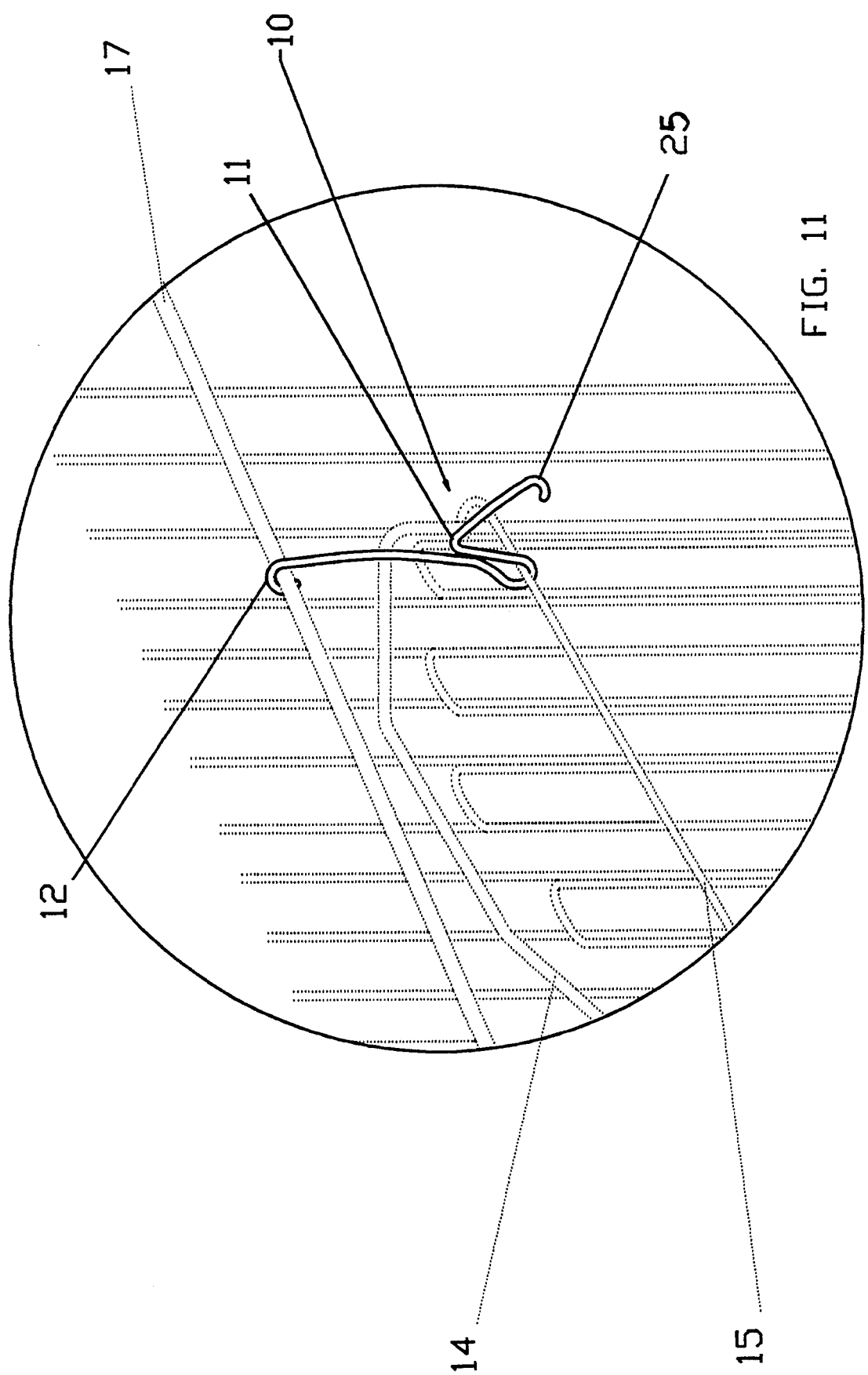
FIG. 11 is a perspective view of a section of a cage, in dotted lines, showing the combination lock-latch in a latch position.

Birds and animals are intelligent enough to open sliding vertical doors by themselves. This invention protects pets from exiting on their own. The combination lock-latch 10 of the invention when snapped onto the cage door horizontal rod 15 becomes part of the door 14 and is always ready for use. When desired, latching the cage door 14 in the open position as shown in FIGS. 2, 8 and 11, provides freedom for the bird or animal to exit and enter without assistance. The prior art procedure with sliding vertical doors is to open and tie the door open using a paper covered wire twist as recommended by pet store owners as shown in FIG. 9. This is a difficult enough task for a person having two hands let alone disabled persons.

Most bird cages have three vertical sliding doors, one each for food and water and a larger middle door for access. The instant invention allows a pet owner to open and latch any of the three doors, and then proceed to change the food, water, or to access the middle door. When the cage door 14 is raised without the use of the combination lock-latch 10, the lock 11 engages the lower cage horizontal rod 16, thus restricting its upper movement. When the latch 12 is grasped and raised in an upper movement, the latch 12 causes the lock 11 to swing out and thereby pass by lower cage horizontal rod 16 thus allowing the cage door 14 to move upwardly to its open position. When in the fully open position, latch 12 can now be engaged with (hooked over) the upper cage horizontal rod 17 to secure the cage door 14 in an open position.

Although the device described in detail above has been found to be most satisfactory and preferred, many variations in mechanics, structure and method are possible. The above are exemplary of the possible changes or variations because many varying and different embodiments made within the scope of the inventive concept herein taught and because many modifications may be made in the embodiments herein detailed in accordance with the descriptive requirements of law, it should be understood that the details herein are to be interpreted as illustrative and not in a limiting sense.

What is claimed is:

1. A combination, cage locking and latching device, for preventing unauthorized opening of a vertically sliding cage door and for holding a cage door open when desired, said device comprising:

a cage having at least one vertically sliding door, said door having an upper horizontal rod, and said cage having a first horizontal rod and a second horizontal rod, a single length of shaped wire having a locking portion, a latching portion, and a "U"-shaped mounting portion formed between said locking portion and said latching portion, at a position nearer said locking portion, said mounting portion being formed to be rotatably mounted on, and secured against removal from, said cage door upper horizontal rod, said locking portion being formed sufficiently long to extend below and to engage said first horizontal rod of said cage and thereby preventing unauthorized opening, and said latching portion being formed and positioned to extend outside said cage for grasping and pulling said cage door upwardly to an open position and sufficiently long for engaging said second horizontal rod of said cage for holding said cage door in an open position when latched on said second horizontal rod.

2. A combination, cage locking and latching device as defined in claim 1 wherein said wire is steel and said mounting portion is secured against removal by crimping.

3. A combination, cage locking and latching device as defined in claim 1 wherein said wire is plastic and said mounting portion is secured against removal by plastic memory.

4. A combination, cage locking and latching device, for preventing unauthorized opening of a vertically sliding cage door and for holding a cage door open when desired, said device comprising:

a cage having at least one vertically sliding door, and said door having an upper horizontal rod and said cage having a first horizontal rod and a second horizontal rod, a single length of shaped light gauge steel wire having a one sixteenth inch outer diameter, and having a locking portion, a latching portion, and a "U"-shaped mounting portion formed between said locking portion and said latching portion, said "U"-shaped mounting portion being formed to be rotatably mounted on, and secured against removal from, said cage door horizontal rod, said "U"-shaped portion hanging in a generally perpendicular relationship with said cage, said locking portion being formed at an angle of 135° from horizontal and being formed sufficiently long to extend below and to engage said first horizontal rod of said cage and thereby preventing unauthorized opening, and said latching portion being formed at an angle of 62° from horizontal and positioned to extend outside said cage for grasping and pulling said cage door upwardly to an open position and sufficiently long for engaging said second horizontal rod of said cage for holding said cage door in an open position when latched on said second horizontal rod.

* * * * *